(No Model.)
R. BROWN.
CHAIN WHEEL.
No. 452,767. Patented May 19, 1891.
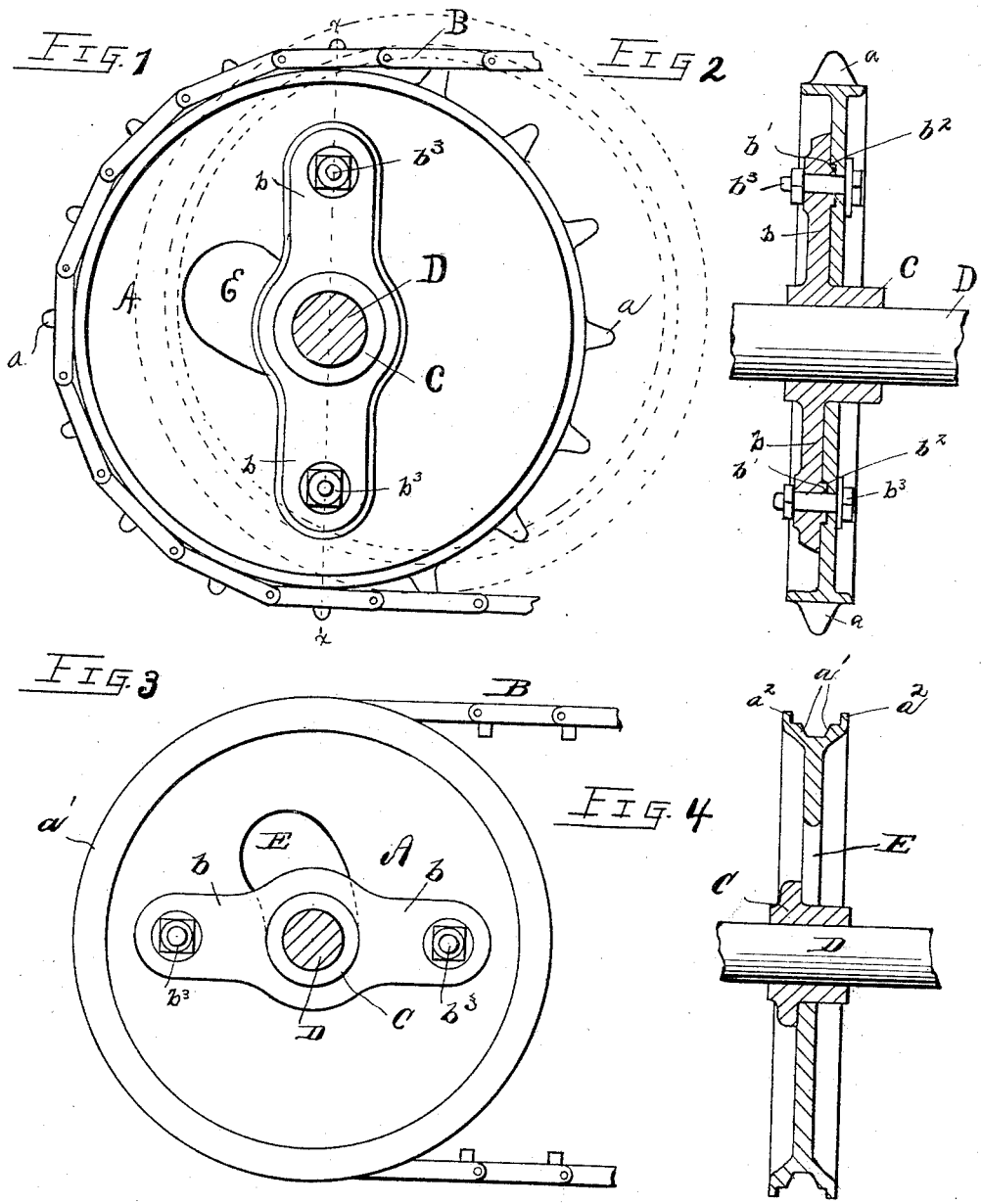
WITNESSES:
Chas. I. Welch
W. Elwood
INVENTOR
Robert Brown
BY
[signature]
ATTORNEY.

UNITED STATES PATENT OFFICE.

ROBERT BROWN, OF MIAMISBURG, OHIO.

CHAIN-WHEEL.

SPECIFICATION forming part of Letters Patent No. 452,767, dated May 19, 1891.

Application filed June 6, 1889. Serial No. 313,262. (No model.)

*To all whom it may concern:*

Be it known that I, ROBERT BROWN, a citizen of the United States, residing at Miamisburg, in the county of Montgomery and State of Ohio, have invented certain new and useful Improvements in Chain-Wheels or Pulleys, of which the following is a specification.

My invention relates to improvements in chain-wheels or pulleys, the object of my invention being to provide a novel construction adapted to be used in connection with driving belts or chains, whereby the periphery or perimeter of the pulley or chain wheel may be moved to an unusual position with reference to its center of revolution to permit the belt or chain to be placed thereon.

This invention is particularly adapted for use with driving-chains running over sprocket-wheels, the sprockets or teeth of which engage with the links of the chain. In the use of driving-gear or mechanism of this character difficulty has been experienced in placing the chains on the sprocket-wheels without an undue amount of slack in the said chain necessary to pass the chain over the teeth, but undesirable in the operation of the driving mechanism. It has been common in gearing of this character to use tighteners to take up the slack after the chain is in place on the wheel. By my improved device herein described I provide for changing the periphery or perimeter of the wheel or pulley with reference to its center to permit the chain to be placed thereon, after which the wheel or pulley is secured in its normal position with reference to its center of revolution or supporting-shaft.

In the accompanying drawings, which form a part of this specification, Figure 1 is a side elevation view of a sprocket-wheel and chain to which my invention has been applied, the position of the sprocket-wheel for receiving the chain being shown by dotted lines. Fig. 2 is a sectional view of the same on the line X X in Fig. 1. Fig. 3 is a side elevation view of a modification of the device, the chain or belt in this case being adapted to operate by friction upon flanges on the periphery of the wheel or pulley. Fig. 4 is a vertical sectional elevation of the same.

Like parts are represented by similar letters of reference throughout the several views.

In the said drawings, A represents a sprocket-wheel, the periphery or perimeter of which may be formed with sprocket-teeth $a$ or in any other well-known and desirable manner to engage with a driving-chain B.

C is a detachable or separable hub adapted to fit upon and be secured to a supporting-shaft D, this separable hub C being also adapted to be secured to the wheel A, so that when in the normal position the periphery or perimeter of the wheel A shall be concentric with the hub C and supporting-shaft D, means being also provided by which the wheel may be detached from said hub and moved to an unusual position or eccentric to said hub and supporting-shaft D to permit the chain to be placed in position on said wheel. In Figs. 1 and 2 for this purpose I have shown the hub C provided with projecting ears or flanges $b$ in a plane parallel with the arms or web of the said wheel or pulley and at right angles to the supporting-shaft. These ears or flanges are each preferably provided with a projecting boss $b'$, adapted to fit into a depression or pocket $b^2$ in the arm or web of the wheel A. The hub is held in its normal position by the fastening-bolts $b^3$, which pass through the said ears or flanges and through the web or arm of the wheel A, as shown in Fig. 2.

In Figs. 3 and 4, instead of the sprockets $a$, I have shown projecting flanges $a^2$, having friction-faces $a'$, in connection with which the chain or pulley operates.

The device as thus described, it will be seen, provides for readily removing or replacing driving chains or pulleys without the aid of other independent tightening devices. Both the driving and driven pulleys or sprocket-wheels may be provided with a detachable feature, as described, if desired, though generally its application to the one or the other will be found sufficient.

It will be understood from the above description that by loosening the adjusting-wheel and moving it to an unusual position, as described, the distance from outside to outside of the driving and driven pulleys may be lessened so that an endless chain or belt of suitable length to pass over said pulleys or wheels may readily be placed on the pulleys or wheels over the sprockets or flanges with which said belt or chain is adapted to be engaged. This adjustment is accomplished when the construction shown in Figs. 1 and 2 is used by loosening one of the fastening-bolts $b^3$ and allowing the wheel to swing or turn on the other bolt as the pivot, a slotted opening E being provided in the web or central portion of the wheel A for this purpose, this opening being preferably formed on an arc of a circle struck from the fastening-bolt $b^3$, on which the wheel is adapted to turn, as shown clearly in Fig. 1. When the construction shown in Figs. 3 and 4 is employed, the adjustment is accomplished by loosening the fastening-bolt and turning the wheel on the eccentric portion C' of the hub.

I have described this improvement with special reference to sprocket wheels and chains, though it will be understood that its usefulness is in no wise limited to these constructions, and it is herein intended to describe it in its various modifications and for use in any connection for which it is found applicable.

Having thus described my invention, I claim—

1. A wheel or pulley having a hub separable from the remainder of the wheel, a slotted opening in which said hub is placed, projecting flanges on said hub, a pivoted connection between one of said flanges and the wheel, and means for securing the said flanges to the said wheel, substantially as specified.

2. A wheel or pulley having a hub separable from the remainder of the wheel, projecting ears or flanges on said hub, a pivoted connection between one of said flanges and the wheel, a slotted opening in said wheel formed on the arc of a circle from said pivoted connection and adapted to receive said hub, and detachable means for securing said hub on the opposite sides of said opening, substantially as specified.

3. A wheel or pulley having a hub separable from the remainder of the wheel, a slotted opening in said wheel, one end of which is concentric with the center of said wheel, a hub separable from the remainder of the wheel and adapted to fit in said slotted opening, said hub being provided with extending ears or flanges having projecting bosses adapted to fit in corresponding depressions in said wheels, and fastening-bolts passing through said flanges and wheel, substantially as specified.

4. A wheel or pulley having a hub separable from the other parts of the wheel, said hub being provided with projecting flanges, as described, a pivoted connection between said hub and wheel, and a slotted opening in said wheel formed on the arc of a circle whose center is at the center of said pivoted connection, one end of said slotted opening being formed concentric with the center of said wheel, and a detachable connection at the opposite side of said hub from said pivoted connection, substantially as specified.

5. A wheel or pulley having a hub separable therefrom, said hub being provided on opposite sides with projecting ears or flanges, a slotted opening in said wheel formed on the arc of a circle and having one end formed concentric with the center of said wheel, projecting bosses on said ears or flanges adapted to fit in corresponding depressions in said wheel, and detachable bolts passing through said ears and bosses, one of said ears being adapted to form a pivoted connection to permit said hub to be moved in said slotted opening, substantially as specified.

In testimony whereof I have hereunto set my hand this 3d day of June, A. D. 1889.

ROBERT BROWN.

Witnesses:
PAUL A. STALEY,
JOSHUA SCOTT.